(12) United States Patent
Ramesh et al.

(10) Patent No.: US 8,817,780 B2
(45) Date of Patent: Aug. 26, 2014

(54) TS PACKET GROOMING

(75) Inventors: Sridhar Ramesh, Carlsbad, CA (US);
Sugbong Kang, San Diego, CA (US);
Brenndon Lee, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 1100 days.

(21) Appl. No.: 12/188,129

(22) Filed: Aug. 7, 2008

(65) Prior Publication Data
US 2009/0041115 A1 Feb. 12, 2009

Related U.S. Application Data

(60) Provisional application No. 60/954,640, filed on Aug. 8, 2007.

(51) Int. Cl.
*H04L 12/28* (2006.01)

(52) U.S. Cl.
USPC ....... 370/389; 370/252; 375/240.01; 725/118

(58) Field of Classification Search
None
See application file for complete search history.

(56) References Cited

U.S. PATENT DOCUMENTS

| | | | |
|---|---|---|---|
| 6,226,291 B1 * | 5/2001 | Chauvel et al. | 370/392 |
| 6,633,564 B1 | 10/2003 | Steer et al. | |
| 6,728,241 B2 | 4/2004 | Hakkarainen et al. | |
| 2006/0209906 A1 * | 9/2006 | Dabrowa | 370/535 |
| 2006/0212902 A1 | 9/2006 | Seo et al. | |
| 2008/0022321 A1 * | 1/2008 | Ver Steeg et al. | 725/78 |
| 2008/0159278 A1 * | 7/2008 | Balraj et al. | 370/388 |
| 2008/0282310 A1 * | 11/2008 | Koppelaar et al. | 725/118 |

FOREIGN PATENT DOCUMENTS

WO WO 2007/084167 A1 7/2007

OTHER PUBLICATIONS

PCT International Search Report of the International Searching Authority for Application No. PCT/US08/072645.
PCT Written Opinion of the International Searching Authority for Application No. PCT/US08/072645.
Supplementary European Search Report for Application No. EP08797507.4, dated Oct. 12, 2010, 9 pages.
Koppelaar, et al., "Restoration of IP-datagrams in the DVB-H Link-layer for TV on Mobile," Digest of Technical Papers, International Conference, ICCE '06, Jan. 2006, pp. 409-410, IEEE.

* cited by examiner

*Primary Examiner* — Nicholas Sloms
(74) *Attorney, Agent, or Firm* — Ardeshir Tabibi, Esq.; Kilpatrick Townsend & Stockton LLP

(57) ABSTRACT

Received data packets are groomed to improve performance of MPEG-2 transport stream packet in a digital video broadcasting system. Multitude of crosschecking techniques are applied to ensure that crucial pieces of information such as the packet identifier (PID) field, the continuity counter (CC) field, table ID, section length, IP header checksum, table and frame boundaries, application data table size are corrected if necessary.

10 Claims, 10 Drawing Sheets

| Syntax | No. of bits |
|---|---|
| datagram section { | |
| table_id | 8 |
| section_syntax_indicator | 1 |
| private_indicator | 1 |
| reserved | 2 |
| section_length | 12 |
| MAC_address_6 | 8 |
| MAC_address_5 | 8 |
| reserved | 2 |
| payload_scrambling_control | 2 |
| address_scrambling_control | 2 |
| LLC_SNAP_flag | 1 |
| current_next_indicator | 1 |
| section_number | 8 |
| last_section_number | 8 |
| real_time_parameters() | 32 |
| if (LLC_SNAP_flag == "1") { | |
| LLC_SNAP() | |
| } else { | |
| for (i = 0; i < N1; i++) { | |
| IP_datagram_data_byte | 8 |
| } | |
| if (section_number == last_section_number) { | |
| for (j = 0; j < N2; j++) { | |
| stuffing_byte | 8 |
| } | |
| } | |
| if (section_syntax_indicator == "0") { | |
| checksum | 32 |
| } else { | |
| CRC_32 | 32 |
| } | |
| } | |

| section type | table_id |
|---|---|
| MPE section | 0x3E |
| MPE-FEC section | 0x78 |

| Real-Time parameters | |
|---|---|
| delta_t | 12 |
| table_boundary | 1 |
| frame_boundary | 1 |
| address | 18 |

FIG. 3 (Prior Art)

| Syntax | No. of bits |
|---|---|
| transport_packet(){ | |
| sync_byte | 8 |
| transport_error_indicator | 1 |
| payload_unit_start_indicator | 1 |
| transport_priority | 1 |
| PID | 13 |
| transport_scrambling_control | 2 |
| adaptation_field_control | 2 |
| continuity_counter | 4 |
| if(adaptation_field_control=='10' \|\| adaptation_field_control=='11'){ | |
| adaptation_field() | |
| } | |
| if(adaptation_field_control=='01' \|\| adaptation_field_control=='11') { | |
| for (i=0;i<N;i++){ | |
| data_byte | 8 |
| } | |
| } | |
| } | |

FIG. 4 (Prior Art)

| Scenario | Doppler Frequency | C/N (dB) (Enhanced Receiver) | MFER (Enhanced Receiver) | C/N (dB) (Typical Receiver) | MFER (Typical Receiver) |
| --- | --- | --- | --- | --- | --- |
| 8K QPSK Rate 1/2 GI 1/4 | 15 Hz | 8.2 | 3.6% | 9.5 | <5% |
|  | 65 Hz | 8.6 | <2% |  |  |
|  | 95 Hz | 9.4 | <2% | 12.5 | <5% |

TS PACKET GROOMING

CROSS-REFERENCES TO RELATED APPLICATIONS

The present application claims benefit under 35 USC 119(e) of the U.S. provisional application No. 60/954,640, filed Aug. 8, 2007, entitled "TS Packet Grooming", the content of which is incorporated herein by reference in its entirety.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to a method and apparatus for receiving data packets in a digital broadcasting system, and in particular, to a method and apparatus for grooming transport stream packets in a digital video broadcasting (DVB) system.

The MPEG (Motion Pictures Expert Group) standard focuses on the encoding and transport of video and audio data. In general, the MPEG standard uses compression algorithms to reduce the number of bytes to be transmitted and/or stored without noticeably affecting the quality of the original video and audio content.

The International Organization for Standardization (referred to as the ISO/IEC hereinafter) has developed the MPEG-2 standard for the coding of moving pictures and associated audio. The MPEG-2 standard is set forth in four documents. The document ISO/IEC 13818-1 (systems) specifies the system coding of the specification. It defines a multiplexed structure for combining video and audio data and includes timing information necessary to synchronously replay sequences of the video and associated audio. The document ISO/IEC 13818-2 (video) specifies the coded representation of video data and the decoding process required to reconstruct the pictures. The document ISO/IEC 13818-3 (audio) specifies the coded representation of audio data and the decoding process required to reconstruct the sound. And document ISO/IEC 13818-4 (conformance) specifies procedures for determining the characteristics of coded streams and for testing compliance with the requirements set forth in the documents ISO/IEC 13818-1, 13818-2, and 13818-3.

The MPEG-2 standard provides a packet based encoding and transport of multimedia data, wherein video, audio, other data are multiplexed into a bit stream. The bit stream is then segmented into a packetized elementary stream (PES), and then respective packets are multiplexed into either of two distinct streams: a transport stream (TS) or a program stream (PS). A transport stream consists of packets of fixed length (188 bytes) whereas a program stream comprises a multiplex of variable length PES packets. Transport stream is used in the digital video broadcasting (DVB) system whereas program stream is used in error free environments, such as recording programs on digital versatile disc (DVD). The PES is a data structure used to carry elementary stream data. An elementary stream (ES) is either one of coded video, coded audio, or other coded data streams carried in a sequence of PES packets with only one packet identifier (PID).

Transport Stream (TS) packets are used in video broadcasting, where the transmission channel is noisy and facing multiple impairments such as multipath fading, group delay variation, Doppler effect due to a receiver moving in relation to a broadcast station, carrier frequency offset caused by local oscillator drift, carrier phase noise, carrier amplitude imbalance, channel bandwidth aberrations caused by unintentionally filtering, etc.

In contrast to other DVB transmission systems, which are based on the DVB Transport Stream (TS) adopted from the MPEG-2 standard, the DVB-H is the specification for broadcasting services to handheld receivers, and was formally adopted as an ETSI (European Telecommunications Standards Institute) standard in November 2004. More specifically, DVB-H is a terrestrial digital TV standard that mandates power savings and allows receivers to move freely while receiving services. DVB-H is based on the Internet Protocol (IP). In consequence, the DVB-H baseband interface is an IP interface format. This interface allows the DVB-H system to be combined with other IP-based networks. This combination is one feature of the IP datacast system. The MPEG-2 TS is still used by the link data layer. Encoded multimedia data are mapped into variable length IP packets called IP datagrams. The IP datagrams are encapsulated into the transport stream by means of the multi-protocol encapsulation (MPE), an adaptation protocol defined in the DVB Data Broadcast Specification ETSI EN 301192.

On the level of the MPE, an additional stage of forward error correction (FEC) is added. This technique, called MPE-FEC, is one of the main innovation of DVB-H. MPE-FEC complements the physical layer FEC of the underlying DVB-T standard. It is intended to lower the signal-to-noise (SNR) requirements for reception by a hand-held device.

The MPE-FEC processing is located on the link layer at the level of the IP input streams before they are encapsulated by means of the MPE. FIG. 1A is a block diagram of a DVB-H transmitter including the DVB-H codec that comprises the MPE-FEC, the MPE, and a time slicing technique. The time-slicing technique is a power saving feature of the DVB-H system that assigns transmitted programs in time slices, hence, allows a receiver to be active only at the period of interest to receive a burst of data and then powered down for the rest of power-save period. The IP input streams provided by different sources as individual elementary streams are multiplexed according to the time slicing method. The output of a single MPEG audio or video coder is called an Elementary Stream (ES). The MPE-FEC error protection is calculated separately for each individual elementary stream.

IP diagrams are encapsulated into MPE sections. MPE sections are further protected with a forward error correcting (FEC) code. A Reed-Solomon code RS(255, 191, 64) code is used for data reliability enhancement and forms the FEC sections. The IP input streams provided by different sources as individual elementary streams (ES) are multiplexed according to the time slicing method. Video programs are encoded into MPEG-2 formats, the encoded data are then packetized and multiplexed with the MPE-FEC sections to form transport stream (TS) packets. The DVB-T coder 101 comprises a 4K modulator and transmitter parameter signaling (TPS) information indicating that the DVB-H transmission is compatible with the DVB-T standard in the physical layer. FIG. 1B shows a prior art block diagram of a DVB-H receiver. The receiver 120 includes DVB-H demodulator 122 that recovers the MPEG-2 transport stream (TS) packets. TS packets 124 are then applied to DVB-H IP-decapsulator 130 that includes time slicing module 134. Timing slicing module 134 controls the receiver to decode the wanted service and shut off during the other services. It aims to reduce receiver power consumption. MPE-FEC module 136 offers a complementary FEC function that allows the receiver 120 to cope with particular difficult reception situations.

A transport stream packet can carry many different programs and each may use a different compression factor and a bit rate that can change dynamically though the overall bit rate stays constant (statistical multiplexing).

As the DVB-H standard is specified for digital video broadcasting for mobile and hand-held receiver devices that sometimes may not have good reception due to the small size of antennas and due to their moving speed relative to the broadcast station, motivation is high to provide a method and apparatus for improving the quality of demodulated data packets.

BRIEF SUMMARY OF THE INVENTION

The present invention provides a method and apparatus for grooming transport stream packets that can support a multitude of data services. In accordance with one embodiment of the invention, a multitude of crosschecking techniques are applied to reconstruct partly correct received TS packets and improve the performance of MPE-FEC processing in order to produce error-free IP datagrams.

In one embodiment of the present invention, a DVB receiver includes, in part, a demodulator and an interface block configured to receive a number of demodulated transport stream packets in accordance with a set of predetermined conditions that are applied to selected packet segments of a MPEG-2 transport stream. The receiver further comprises a packet processor having a parser and a Boolean logical unit configured to perform logical operations on a set of patterns that can be single bit and/or multiple bits contiguously grouped together or physically distributed within a received packet and/or across multiple packets. The packet processor may be coupled to a memory module containing algorithms configured to perform with the packet processor a plurality of crosschecking and adjustment functions. The detection of a received packet may start with locating a sync pattern and obtaining a predetermined number of consecutive correct sync patterns. Once a predetermined number (e.g., five) of sync pattern are consecutively received, the correct boundary of a packet can be identified. The processor can then parse (defined as examine and identify predefined fields of interest) a header field of the transport stream packet. The header field comprises multiple sets of bit pattern that are crucial for the crosschecking and adjustment techniques of the present invention. Packets having the same Packet Identifier (PID) field will be stored at the corresponding location in a memory module and their individual Continuity Counter (CC) field will be checked against a shadow counter value. The shadow counter may be a 4-bit binary counter that counts from 0 to 0xF and wrap-around, i.e., the shadow counter can be a modulo-16 counter. The packet processor may perform the following crosschecking steps. If the PID field matches a preselected PID value and the CC field does not match the value of the shadow counter, the processor will adjust the CC field. If the CC field matches the shadow counter value and the PID value does not match the preselected PID value, the processor will adjust the PID field. The packet processor may temporarily store a received packet in a buffer for further processing, i.e., modifying the fields of interest such as the PID and the CC fields based on respective PID and CC recovery rules according to one embodiment of the present invention. The packet processor may forward the received TS packet to a following IP-decapsulator if its PID field matches the preselected PID value and its CC field matches the shadow counter value.

The packet processor may further check an "adaptation field control" status in order to determine if an adaption field is of irregular length. The processor may adjust the adaption field length to a regular length if the adaptation field control is one of the '10' or '11' binary pattern. The processor may further check the status of a "payload-unit-start-indicator" (PUSI) field. A PUSI field of zero indicates that the transport stream (TS) packet does not carry the start of a new payload. The processor may reset the PUSI field if the PID field matches the preselected value and the PUSI field does not match an expected PUSI value (e.g. '0').

The packet processor may further check a pointer field against an expected pointer value, and set the pointer field to a minimum length value if the PID field matches. The minimum length value can be defined as the minimum of a residual section length value and the result of the subtraction of the adaptation field length from a constant (e.g., decimal 183).

The packet processor may further check a section length field against an IP length value and verify the validity of an IP checksum, adjust the section length field to the IP length value if the section length field does not match the IP length value and the IP checksum is valid, and retain the section length field if the section length field matches and the IP checksum is valid.

The packet processor may further check an address field against an expected address value, correct the address field based on a current location of a section if the address field does not match. The packet processor may further check a table boundary flag and a frame boundary flag, and modify the table and frame boundaries following rules described in the corresponding section of the specification.

BRIEF DESCRIPTION OF THE DRAWINGS

FIG. 3 shows the MPE section syntax in accordance with the DVB-H Transport Stream defined in ETSI EN 301192 and ISO/IEC 13818-6.

FIG. 4 shows an MPEG-2 TS packet in accordance with the MPEG standard.

The following detailed description together with the accompanying drawings will provide a better understanding of the nature and advantage of the present invention.

DETAILED DESCRIPTION OF THE INVENTION

Figure 1A:
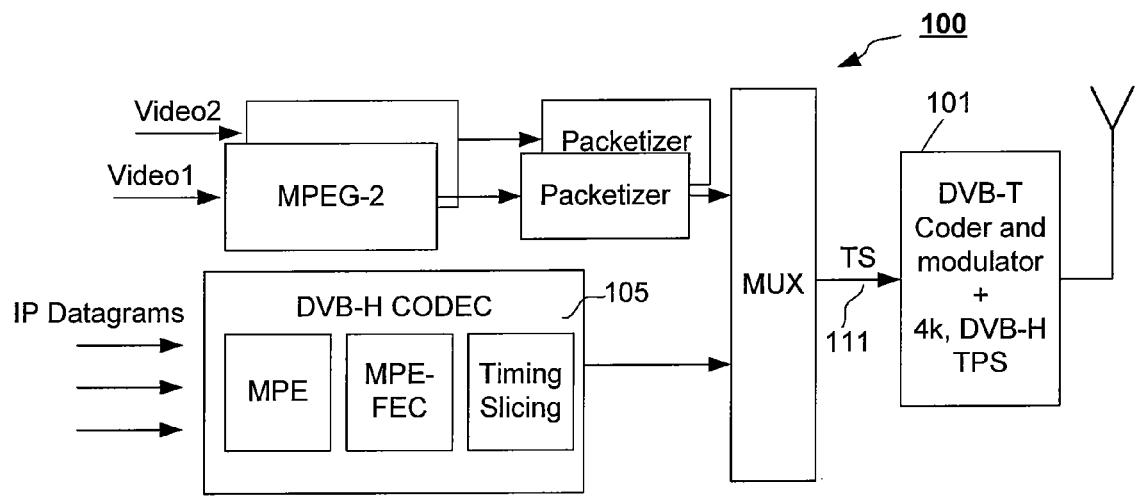
FIG. 1A is a block diagram of a DVB-H transmitter, as known in the prior art.
Figure 1B:
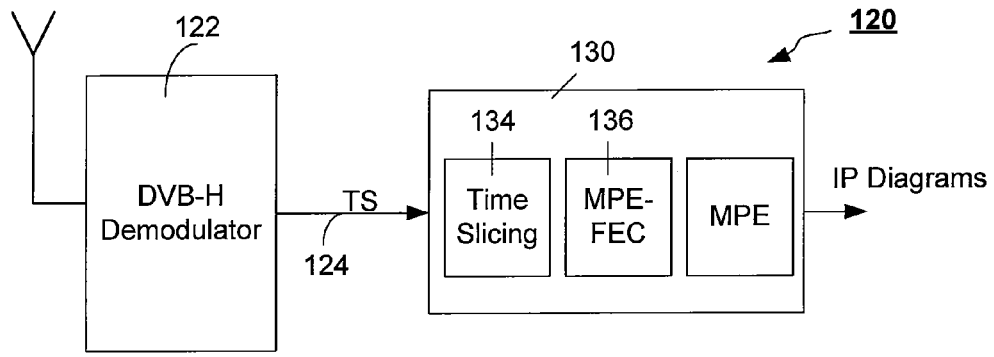
FIG. 1B is a prior art block diagram of a DVB-H receiver, as known in the prior art.
Figure 1C:
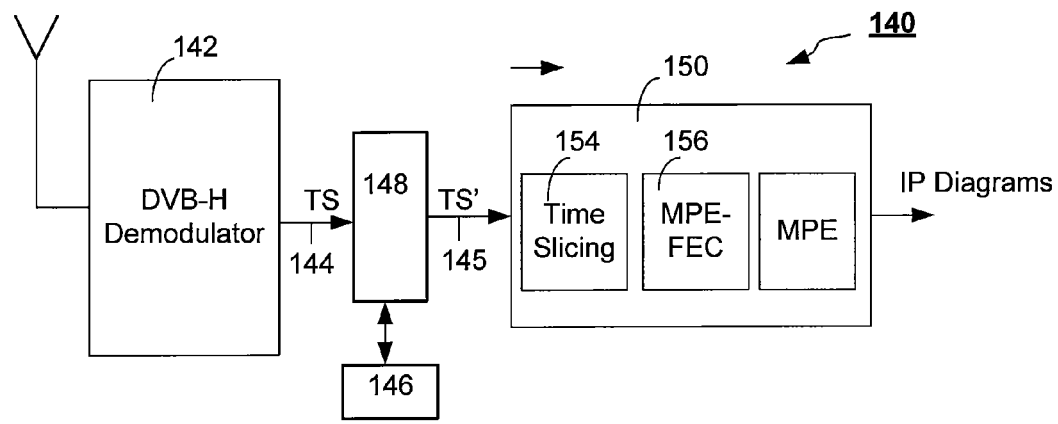
FIG. 1C is an exemplary block diagram of a DVB-H receiver, in accordance with one embodiment of the present invention.

FIG. 1C is a block diagram of an exemplary DVB-H receiver 140 according to one embodiment of the present invention. The receiver embodiment 140 includes, in part, packet processor 148 that is interposed between the DVB-H demodulator block 142 and the time slicing block 154. Packet processor 148 intercepts and processes a number of TS packets 144 and outputs a groomed TS' packet 145 that is then applied to the IP decapsulator block 150. As used herein the term "groom" describes a modified TS packet in accordance with embodiments of the present invention to improve the carrier-to-noise (C/N) ratio. Packet processor 148 is coupled to memory module 146, which stores algorithms for crosschecking multiple sets of bit patterns in the TS packets to correct crucial fields in received TS packets, and hence, improve the performance of MPE-FEC processing and decapsulation of IP datagrams. The crosschecking techniques of the present invention will be described in detail in the following sections.

Figure 2:
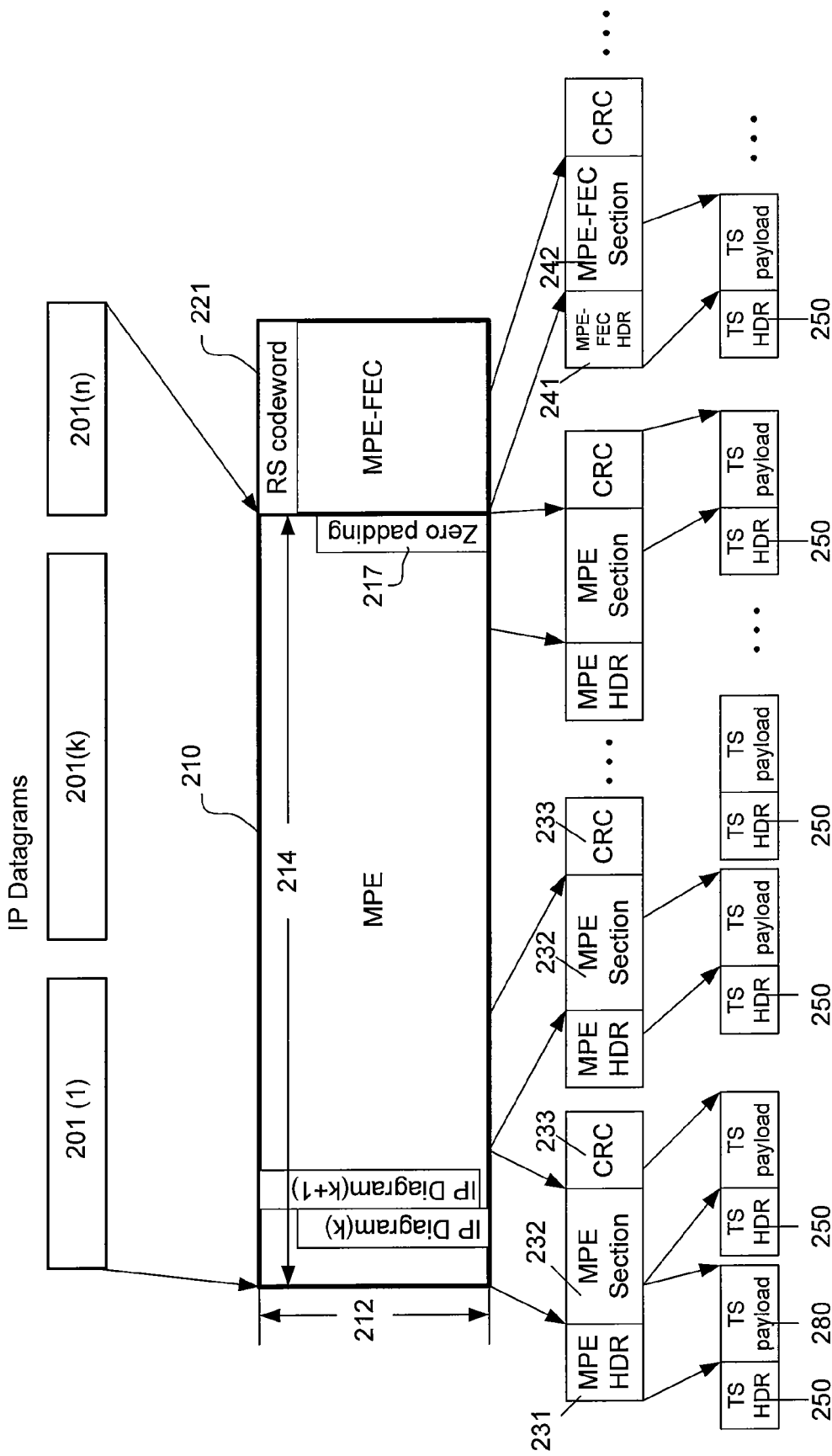
FIG. 2 shows encapsulation of IP datagrams in TS packets through an MPE, as known in the prior art.

The DVB standard specifies that IP datagrams are carried in an MPEG-2 TS through the multiprotocol encapsulation (MPE). FIG. 2 shows that each IP datagram 201 is encapsulated into MPE 210. MPE 210 is in turn encapsulated into MPE section 232. A stream of MPE sections are then put into an elementary stream (ES), i.e., a stream of MPEG-2 TS packets with a particular program identifier (PID). Each MPE section has a 12-byte header 231, a payload length 232, and a 4-byte cyclic redundancy check (CRC-32) tail 233. The total payload length is identical to the length of the IP datagram.

MPE 210 comprises a number of rows 212 and a number of columns 214. The number of columns corresponds to 191 bytes, and the number of rows is equal to 256, 512, 768, or 1024. Each row of 191 bytes is further protected by a Reed-Solomon (RS) code, which produces additionally 64 RS-parity bytes (an RS codeword) for the MPE-FEC 221. Therefore, the MPE-FEC encoder creates a specific frame structure called the FEC frame, incorporating the IP datagrams 201. The FEC frame consists of a maximum of 1024 rows and a constant number of 255 columns, for a maximum of 261,120 bytes. The MPE data are encapsulated into a number of MPE sections 232, and the RS data are encapsulated into a number of MPE-FEC sections 242. MPE-FEC sections 242 are sent immediately after the last MPE section, in the same ES, but with different table_id than the MPE sections. The use of two different table_ids enables the receiver to discriminate between the two types of sections.

The number of rows in the MPE-FEC frame is signaled in the service information and may take any of the values 256, 512, 768, or 1024. The number of columns is 191 for the application data table (ADT) and 64 for the RS data table 221. The IP datagrams of a particular burst are introduced vertically column-by-column in the ADT, starting at the upper left corner. If an IP datagram does not end exactly at the bottom of a column, the remaining bytes continue from the top of the next column. If the IP datagrams do not exactly fill the ADT, the remaining byte positions are padded with zeroes (zero padding 217). On each row the 64 parity bytes of the RS data table 221 are calculated from the 191 IP datagram bytes (and padding bytes, if application) of the same row, using the Reed-Solomon code RS(255, 191, 64).

Headers 231 of MPE sections 232 and headers 241 of MPE-FEC sections 242 contain a 4-byte real time parameter field, which include a 12-bit start address, which indicates the byte number (counted from the start of the ADT table) of the start position of the corresponding IP datagram or RS column, as well as the 18-bit delta_t parameter and 1-bit table boundary flag and frame boundary flag to signal end-of-table and end-of-frame.

FIG. 3 is the MPE section syntax in accordance with the DVB-H Transport Stream defined in ETSI EN 301192 and ISO/IEC 13818-6. FIG. 4 is the MPEG-2 transport stream packet format syntax in accordance with the MPEG-2 standard.

Figure 5:
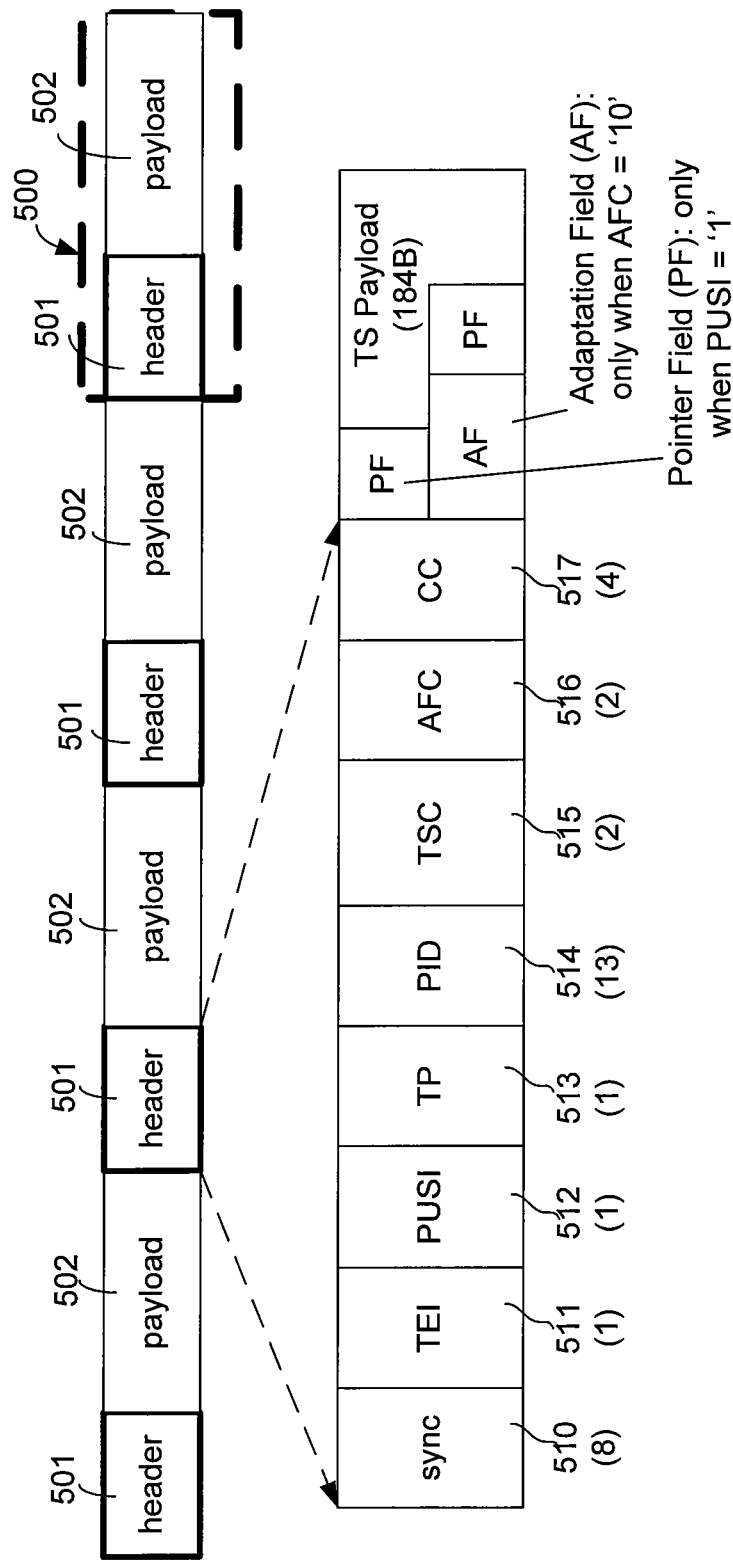
FIG. 5 shows IP diagrams encapsulated into multiple TS packets through the use of multiprotocol encapsulation (MPE), as known in the prior art.

FIG. 5 illustrates multiple transport stream packets 500 of 188 bytes, each packet including a header 501 and a payload 502. Each header 501 includes an eight (8) bit sync byte field 510, a one (1) bit transport error indicator field 511, a one (1) bit payload unit start indicator field 512, a one (1) bit transport priority field 513, a thirteen (13) bit packet identifier field 514, a two (2) bit transport scrambling control field 515, a two (2) bit adaptation field control field 516, a four (4) bit continuity counter field 517, and an optional adaptation field 518. Each of these fields is described in the MPEG-2 standard. Only fields that are relevant to embodiments of the present invention are described below.

The sync byte 510 has a binary pattern of "01000111" (0x47) and identifies the start of a transport stream (TS) packet. The payload unit start indicator (PUSI) field 512 indicates whether the TS packet carries the start of a new payload (PUSI="1") or the TS packet does not carry the start of a new payload (PUSI="0"). The packet identifier (PID) field 514 indicates the type of data carried in the payload 502. Certain PID values are reserved.

The continuity counter (CC) field 517 counts the number of consecutive TS packets having the same PID field 514 value. The four-bit continuity counter field 517 is used to help with detecting broadcast errors. The counter typically runs from 0 to 0xF and then restarts at 0 again. The next packet in the stream having the same PID will have the continuity counter field incremented by one. In this way the continuity counter runs in a continuous sequence within all packets of the same PID. However, the continuity sequence for packets with a different PID will be different.

Figure 6A:
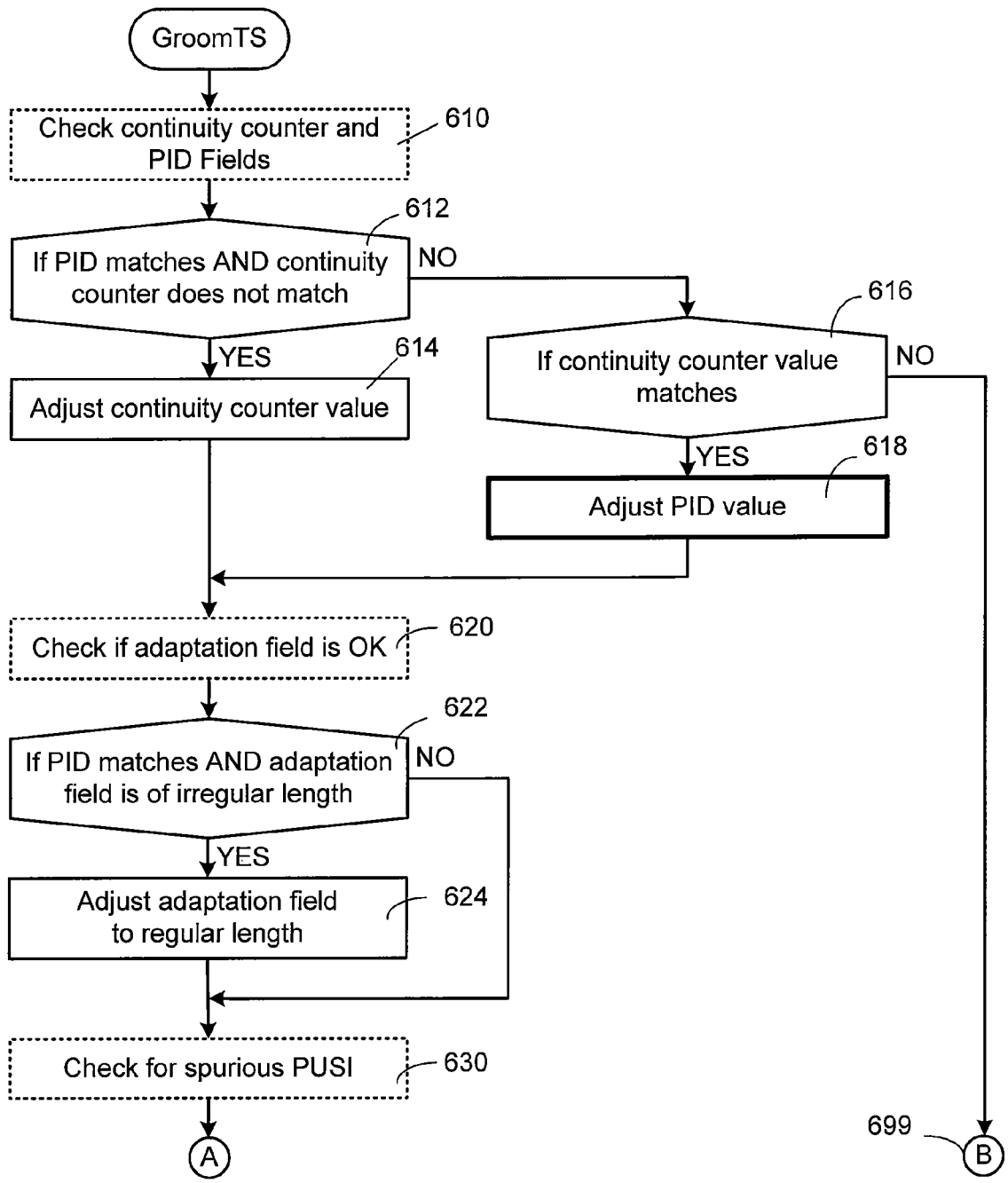
FIG. 6A-D show a flowchart illustrating a method for grooming TS packets using the crosschecking techniques in accordance with one embodiment of the present invention.

FIG. 6A shows a method of grooming TS packets according to one embodiment of the present invention. The method comprises parsing header 501 on a received TS packet 500 after having identified the start of the TS packet (e.g., after successfully receiving a consecutive number of sync patterns) and performing packet identifier (PID) field 514 and Continuity Counter field 517 filtering. The method further comprises comparing the PID field 514 against a preselected PID value and checking the CC field 517 against a value in a shadow counter. The preselected PID value can be a wanted service value provided by a user. At step 610, the packet processor performs the verification of both the CC field and the PID field. At step 612, the packet processor compares the PID field 514 against the "wanted" PID service value and the CC field 517 against the value in the shadow counter by performing Boolean operations. The software (machine readable codes) containing in the memory module 146 may execute the following instructions: If the PID field 514 matches the wanted PID service value and the CC field 517 does not match the shadow counter value, the packet processor will (can) adjust (modify) the CC field 517 with the shadow counter value at step 614. The recovery of the CC value will be further described in detail in the following sections.

CC Recovery

This refers to recovery of the continuity counter value. The behavior of the continuity counter is governed by the following rules (excerpt from ISO/IEC 13181-1):

The continuity_counter is a 4 bit field incrementing with each Transport Stream packet with the same PID. The continuity_counter wraps around to 0 after its maximum value. The continuity_counter shall not be incremented when the adaptation_field_control of the packet equals '00' or '10'.

In Transport Streams, duplicate packets may be sent as two, and only two, consecutive Transport Stream packets of the same PID. The duplicate packets shall have the same continuity_counter value as the original packet and the adaptation_field_control field shall be equal to '01' or '11'. In duplicate packets each byte of the original packet shall be duplicated, with the exception that in the program clock reference fields, if present, a valid value shall be encoded.

The continuity_counter in a particular Transport Stream packet is continuous when it differs by one increment from the continuity_counter value in the previous Transport Stream packet of the same PID, or when either of the non-incrementing conditions (adaptation_field_control set to '00' or '10', or duplicate packets as described above) are met. The continuity counter may be discontinuous when the discontinuity_indicator is set to '1' (refer to 2.4.3.4). In the case of a null packet the value of the continuity_counter is undefined.

At step 616, the PID field and the CC field can have one of the two conditions: (i) If the PID field 514 matches and the CC field 517 matches, the TS packet can be forwarded to a DVB-H decapsulator at step 690, (ii) If the PID field 514 does not match the wanted PID service value and the CC field 517 matches the shadow counter value, the PID field 514 will (can) be adjusted with the wanted PID service value at step 618. The PID field recovery is further described in the following section.

PID Recovery

When the PID field gets corrupted in a packet with the correct continuity counter value, this scheme potentially recovers the PID value. In accordance with one embodiment of the present invention, the continuity counter of a received packet is compared with the expected continuity counter of all PIDs bearing IP/MPE streams. If the CC value matches the expected CC value of one and only one PID, the PID recovery scheme corrects the PID field of the received TS packet to that of the PID with the CC field that matches.

At step 620, the method shown in FIG. 6A further comprises parsing of the adaption field control 516. At step 622, the packet processor checks if there is a match in the PID field 514 and the adaptation field 518 is of irregular length, the adaptation field will be adjusted at step 624. The adaptation field is generally used for the following purposes in an MPE stream:

1) To pad TS packets with non-protocol data when section packing is not used.
2) A 1 byte adaptation field can be used when the residual length of an MPE section is 183 (there is no room to start a new section in this TS packet).
3) By the multiplexer to signal some additional information.

In accordance with one embodiment of the present invention, the packet processor 148 performs initial training on the encapsulation algorithm to determine the MPE encapsulation scheme. If section packing is used with no adaptation field, the TS grooming routine uses this information to correct the adaptation field control by repudiation, except when condition 2) is satisfied.

At step 630, the method further comprises parsing of the PUSI field 512. It is because a corrupted packet can have the PUSI field set to an incorrect value. For example, the PUSI value is equal unity when a received TS packet carries a start of a new payload. At step 632, this condition is verified. If the PID field matches and the PUSI does not match, step 634 will be performed. Otherwise, the PUSI field value will be retained at step 636.

In one embodiment of the present invention, the conditions that need to be satisfied for a received TS packet to have the PUSI set to 1 are: a) The adaptation field control is 0x1 or 0x3, and b) The length of the TS packet payload (184–adaptation field) is greater than the residual length of the section currently under reception. The PUSI is corrected to 0 if either of these conditions is not satisfied.

Conversely, a packet with a section start may have the PUSI corrupted to 0. In one embodiment of the present invention, this condition is detected when the residual section length is less than the payload length, and a table_id field follows immediately afterwards. The table_id is the first byte of an MPE or MPE-FEC section. It is set to 0x3E for MPE sections and to 0x78 for MPE-FEC sections.

Figure 6B:
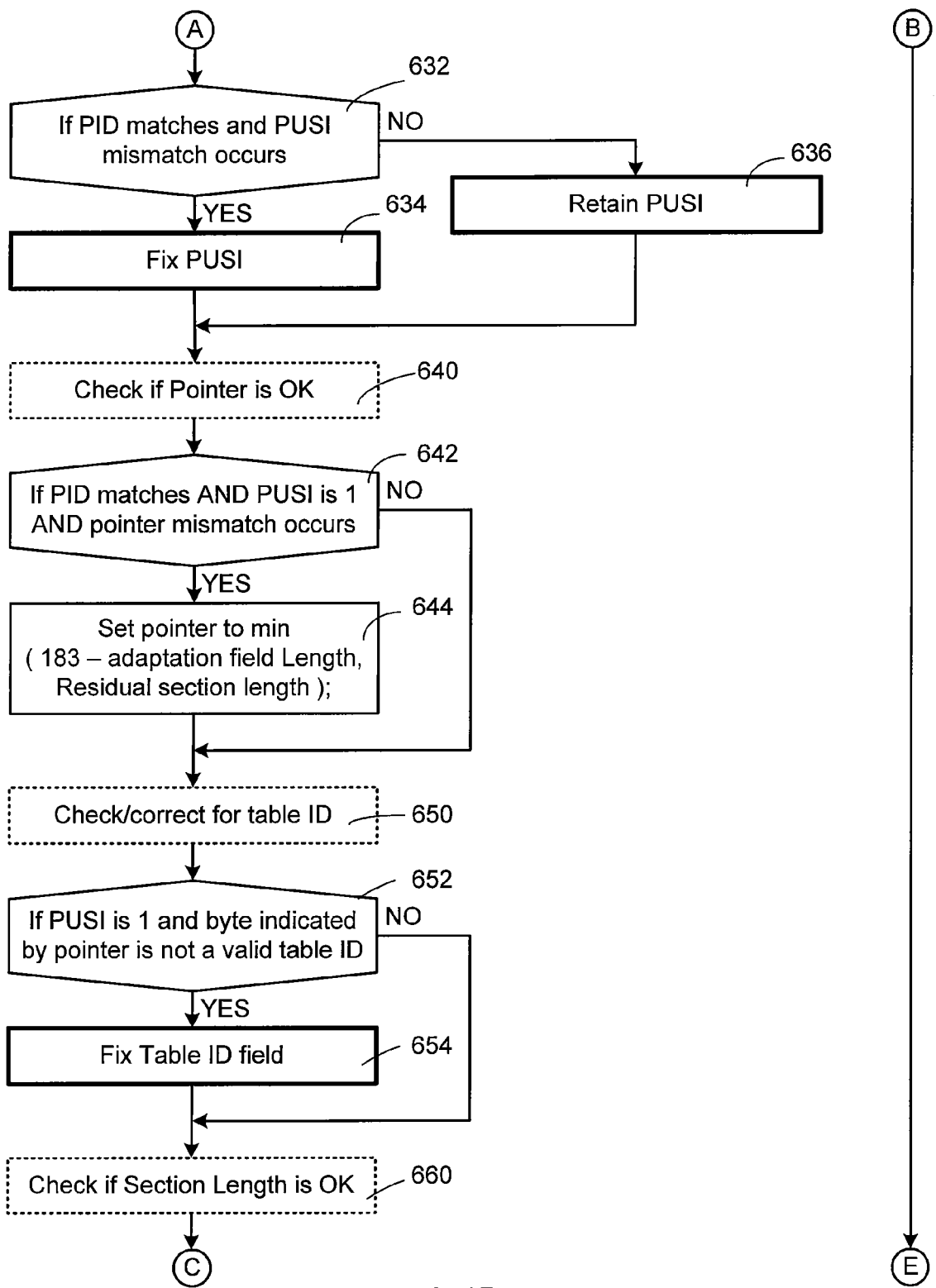

At step 640, the method shown in FIG. 6B further comprises parsing of a pointer field (not shown). The pointer field is the first byte payload byte of a TS packet whose PUSI is unity (="1"). The pointer field contains the number of bytes in the TS packet that immediately follow the pointer field. Corruption in the pointer field can cause the software to lose track of the section headers. Hence, to locate section headers correctly, the pointer field is validated at step 642. If the PID field matches and PUSI is 1 and the pointer field is not equal to the residual section length, a potential corruption of the pointer field will be recognized. At step 644, the pointer value can be substituted by the minimum of the difference between 183 (decimal) and the adaptation field length and a residual section length. In one embodiment of the present invention, if this is a valid table_id (0x3e in case of MPE sections, or 0x78 for MPE-FEC sections), then the pointer value is corrected to the residual section length value.

At step 650, the method shown in FIG. 6B further comprises parsing of a table ID field in the payload (not shown) and comparing it against a predetermined set of valid table_IDs, such 0x00 for PAT, 0x01 for CAT, 0x02 for PMT, 0x40 for NIT, etc. At step 652, the packet processor determines if the PUSI is 1 and the byte indicated by the pointer is not a valid $table_{13}$ ID, the packet processor will adjust the table ID field at step 654.

At step 660, the method further comprises parsing of a section length and comparing it against an IP length. The section length indicates the number of TS packets needed for an associated IP diagram. The maximum size of an MPE section is 4096 bytes so that IP diagrams up to 4080 bytes can be encapsulated (4096–(12-byte section header–(4-byte CRC)). At step 662, the packet processor determines if the section length is not equal to the IP length and the IP header checksum is valid, the section length will be adjusted to the IP length at step 664. Otherwise, the section length will be retained at step 666. The adjustment of the section length is described below.

Section Length

A corruption in the section length field is detected as follows, in accordance with one embodiment of the present invention:

1) If it is an MPE section, the IP datagram length can be compared with the section length. The following relation indicates corruption: IPLength !=MPELength−13. In case of corruption, the IPHeaderLength value can be verified using:
   a. IP Header Checksum: If IP Header Checksum passes, then MPELength is assumed to be IPLength+13, or
   b. UDP Length: If IPLength=UDPLength+IPHeaderSize, then MPELength can be amended to IPLength+13.
2) If it is an MPE-FEC section, the table size (number of rows) is used to verify that the section length field is intact.

Figure 6C:
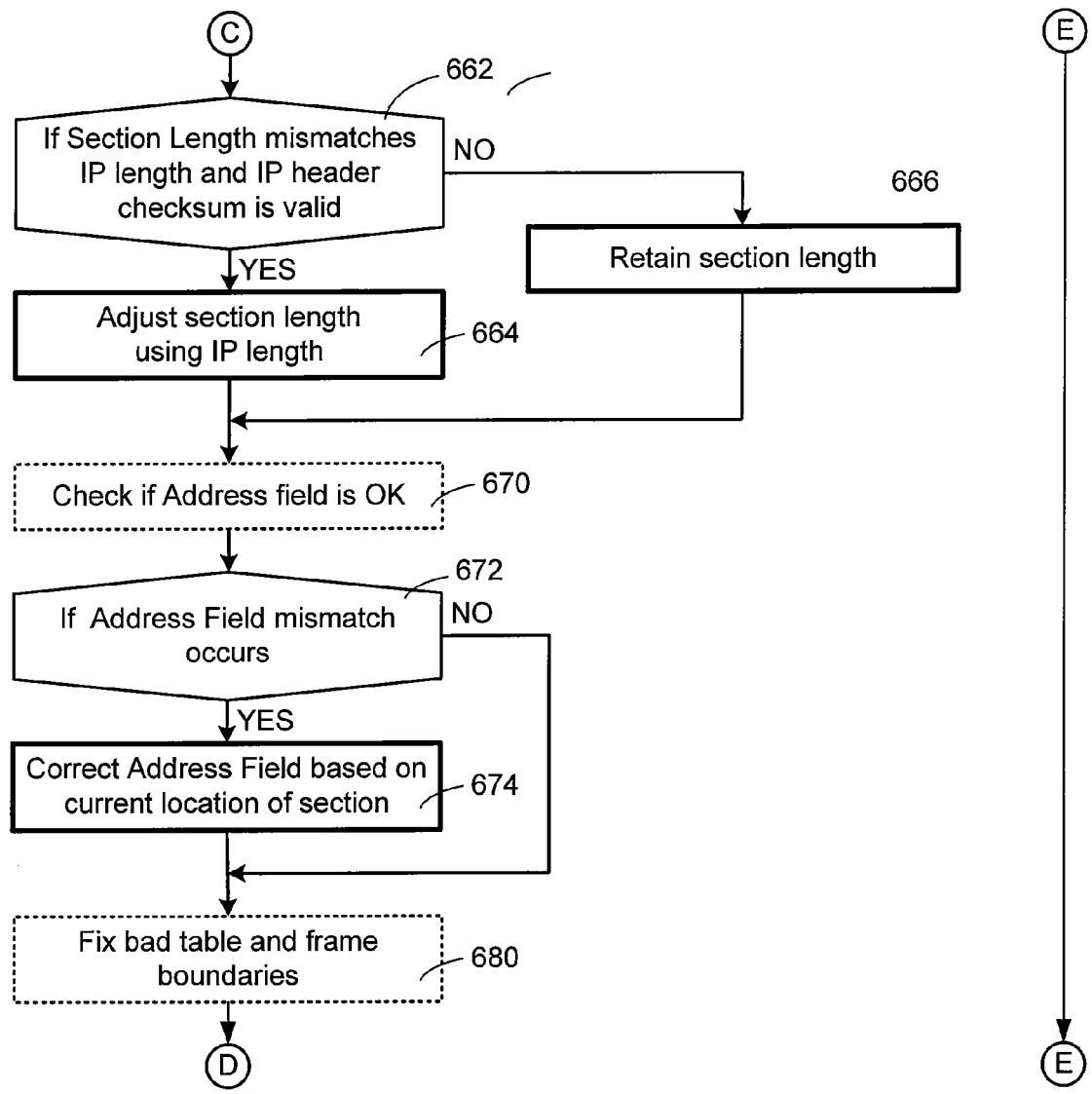
Figure 6D:
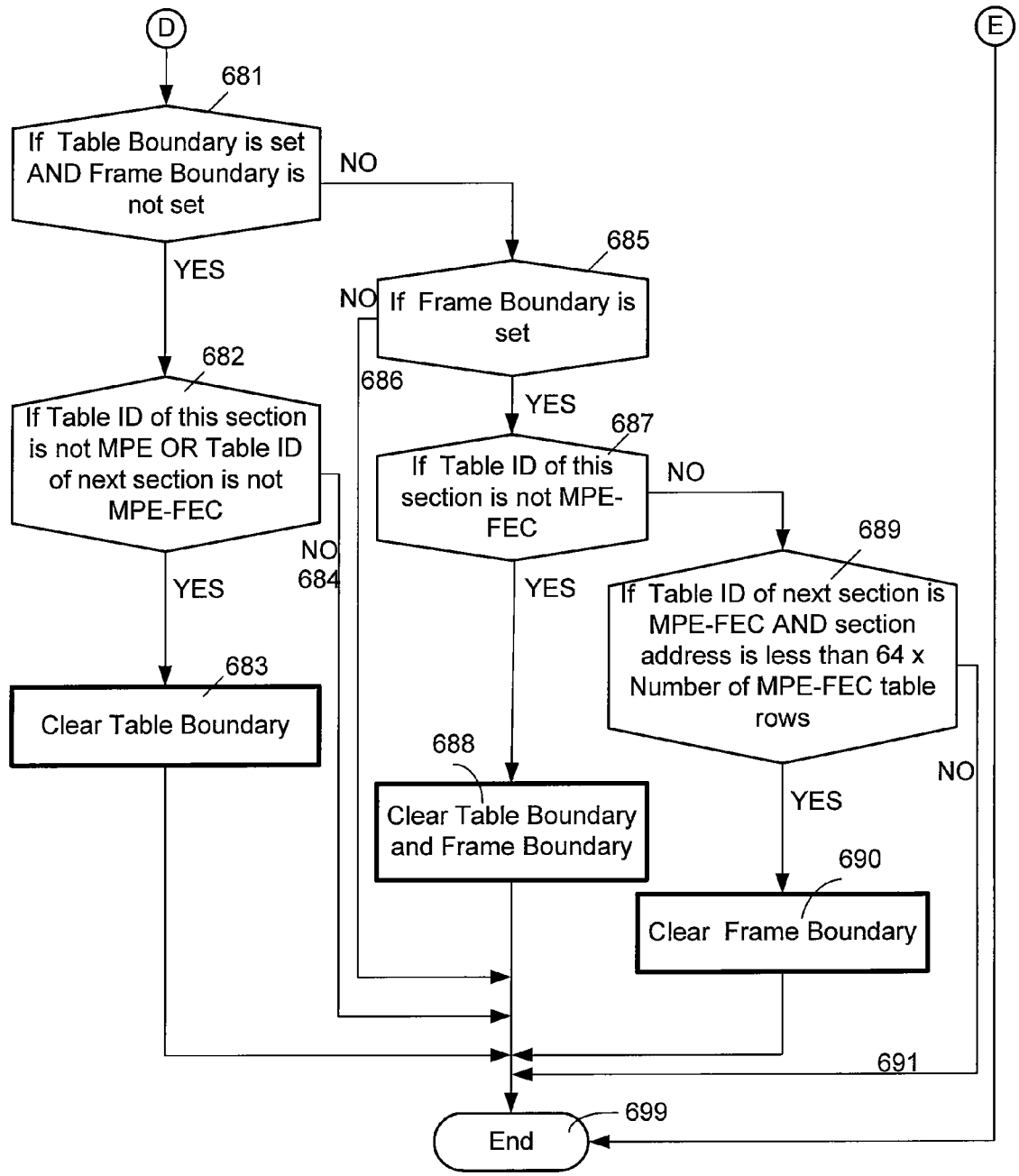

At step 670, the method shown in FIG. 6C further comprises parsing of an address field and comparing it against a number of bytes already written in the MPE table. At step 672, the packet processor determines if the address field does not match the number of bytes already written in the MPE table, the address field is assumed corrupted, and will (can) be corrected based on the current location of the MPE section. For MPE-FEC sections, a correction factor is applied to account for the offset from the application data table.

Figures 7, 8:
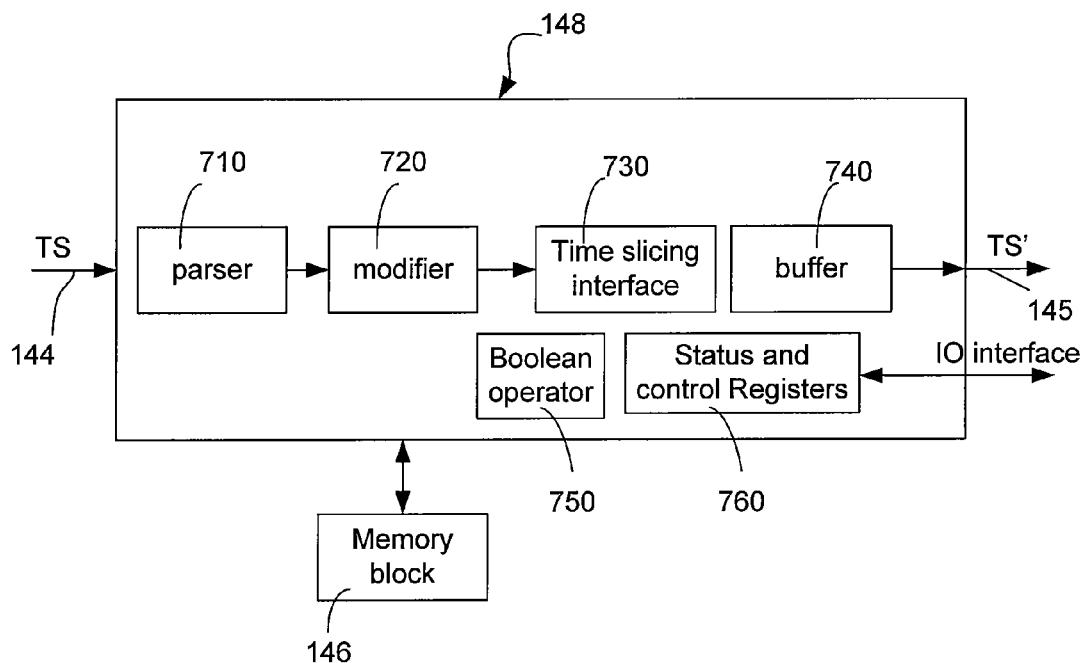
FIG. 7 shows an exemplary packet processor for grooming TS packets according to one embodiment of the present invention.
FIG. 8 shows simulation results illustrating improved performance vs. a typical DVB-H receiver according to one embodiment of the present invention.

At step 680, the method further comprises parsing of an a table boundary flag and a frame boundary flag. The table boundary flag is set to 1 by the transmitter in the last MPE section and the last MPE-FEC section of a frame. A frame boundary is set in the last MPE-FEC section of a frame. False table and frame boundary flags need to be cleared. A flag is regarded false if the TS packet with PUSI flag is corrupted, and the payload does not correspond to the last part of the application data table (ADT) or the RS data columns. At step 681, if the table boundary flag is set and the frame boundary flag is not set, then the packet processor further checks if the table ID of this section is not an MPE section or if the table ID of the next section is not an MPE-FEC section, then the table boundary flag will be cleared ("0") at step 683. If the condition is not met at step 681, the packet processor will check if the frame boundary flag is set at step 685. If the frame boundary flag is not set (i.e., ="0"), the packet is then forwarded to the following timing interface unit 730 at step 686, which is configured to interface with time slicing block 730 (FIG. 7). If the condition is met at step 685, the packet processor will further check if the table ID of this section is not an MPE-FEC section. If the condition is met, the packet processor will clear the table boundary and frame boundary flags at step 688. If the table ID of this section is an MPE-FEC section, then the packet processor further checks if the table ID of the next section is an MPE-FEC section and if the section address is less than the product of 64 times the number of the MPE-FEC table rows. If the condition is met, the packet processor will clear the frame boundary flag at step 690, and forwards the packet to the following time slicing interface for further processing. Otherwise, the processor just forwards the packet at step 691. An exemplary pseudocode for fixing the table and frame boundary flags is described below.

Table and Frame Boundary Flags

Pseudocode for fixing bad table and frame boundary flags of step 680:

```
If (TBL_BDRY is set AND FRM_BDRY is not set)
    If (TBL ID of current section is not 0x3E OR TBL_ID of next
    section is not 0x78)
        Clear TBL_BDRY
    EndIf
Else If (FRM_BDRY is set)
    If (TBL_ID of current section is not 0x78)
        Clear FRM_BDRY
```

-continued

```
    Else If (TBL_ID of next section is 0x78 AND Next Section
    Address <= 64 * Number of MPE-FEC table rows)
        Clear TBL_BDRY and FRM_BDRY
    End If
End If
```

FIG. 7 is an exemplary embodiment of the packet processor 148. The packet processor 148 includes, in part, parser block 710 configured to parse the header of received TS packets in order to filter the PID field 514. The parser 710 also identifies other pre-defined fields of interest, such as the CC field 517, the PUSI field 512, the adaptation field control 516, the pointer field or adaptation field (FIG. 5), the address field (FIG. 3), the table and frame boundary flags (FIG. 3), etc. Boolean operator 750 performs verifications of the fields of interest in a received TS packet. In one embodiment of the invention, the crucial parameters may be corrected based on the result of the Boolean operations by modifier block 720, which adjusts (modifies) the fields of interest according to rules described previously. The packet processor 148 may further include a buffer 740 configured to temporarily store the groomed TS' packet 145. A software (computer program) comprising instructions for executing operations (such as parsing and modifying the fields of interest according to the described rules, etc.) of the packet processor 148 may be stored in the memory module 146. The memory module 146 can be integrated with the packet processor or external to the processor. The packet processor may further include, in part, time slicing interface block 730 and buffer block 740 configured to temporally store groomed TS' packets, and multiple status and control registers configured to provide user interface. In one embodiment of the present invention, the packet processor may be an integrated circuit (IC) or part of an IC, implemented using an ASIC (application specific IC), and FPGA (field programmable gate array), structure gate array, and/or other processors, which may be programmed in any manner known in the art.

FIG. 8 shows simulation results illustrating improved performance vs. a typical DVB-H receiver according to one embodiment of the present invention. The simulation uses a reference TS stream with random byte errors. The errors are determined using the two following parameters:
1) Packet Error Ratio (PER): The ratio of packets that have errors. It is assumed that packet errors are independent and uncorrelated.
2) Conditional Byte Error Ratio (CBER): The fraction of corrupted bytes within a bad packet. Byte errors are also assumed uncorrelated.

The simulation parameters are 8K mode, QPSK, coding rate 1/2, Guard interval 1/4, and the Doppler frequency 15 Hz, 65 Hz, and 95 Hz. It is understood that assumption of uncorrelated byte or packet errors is not strictly valid because burst noise and/or interference is highly likely to produce correlated errors. FIG. 8 indicates that MFER (MPE-FEC Frame Error Ratio) of less than 5 percent can be achieved at 8.6 dB C/N in 65 Hz Doppler, and at 9.4 dB C/N in 95 Hz Doppler in accordance of one embodiment of the present invention. These are (i.e., 1.3 dB to 3.1 dB) better than the performance of a typical receiver (i.e., an implementation just meeting MBRAI specifications).

While the invention has been described with respect to exemplary embodiments, one skilled in the art will recognize that numerous modifications are possible. For example, the processes described herein may be implemented using hardware components, software components, and/or any combination thereof. The specifications and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method of grooming transport stream (TS) packets in a receiver of a digital video broadcasting (DVB) system, the method comprising:
   parsing a header field of a received TS packet;
   comparing a packet identifier (PID) field of the received TS packet with a selected packet identifier (PID) value;
   comparing a continuity counter (CC) field of the received TS packet with an expected CC value;
   modifying the CC field of the received TS packet if the PID field of the received TS packet matches the selected PID value and the CC field of the received TS packet does not match the expected CC value;
   changing the PID field of the received TS packet to the selected PID value if the PID field of the received TS packet does not match the selected PID value and the CC field of the received TS packet matches the expected CC value ; and
   forwarding the received TS packet to a processing module if the PID field of the received TS packet matches the selected PID value and the CC field of the received TS packet matches the expected CC value.

2. The method of claim 1, wherein the processing module is a multi-protocol encapsulation forward error correction decoder configured to process a Reed-Solomon forward error correcting (FEC) decoding function in accordance with an MPEG-2 standard.

3. The method of claim 1 further comprising:
   comparing an adaptation field control of the received TS packet with a predetermined adaptation field control pattern; and
   modifying an adaptation field length if the PID field of the received TS packet matches the selected PID value and the adaptation field control of the received TS packet matches the predetermined adaptation field control pattern.

4. The method of claim 3 further comprising:
   checking a payload unit start indicator (PUSI) field of the received TS packet;
   resetting the PUSI field if the PID field of the received TS packet matches the selected PID value and the PUSI field of the received TS packet is equal to unity; and
   retaining the PUSI field of the received TS packet if the PID field of the received TS packet matches the selected PID value and the PUSI field is equal to zero.

5. The method of claim 4 further comprising:
   comparing a pointer field of the received TS packet with an expected pointer value;
   setting the pointer field of the received TS packet to a minimum length value if the PID field of the received TS packet matches the selected PID value, the PUSI field of the received TS packet is equal to unity, and the pointer field of the received TS packet does not match the expected pointer value ; and
   modifying a table ID field of the received TS packet if the PUSI field of the received TS packet is equal to unity and a byte indicated by the pointer field of the received TS packet is not a valid table ID.

6. The method of claim 5, wherein the minimum length value is the minimum of a residual section length value and the result of the subtraction of the adaptation field length from decimal 183.

7. The method of claim 5 further comprising:
   comparing a section length value of the received TS packet with an IP length value;
   checking the validity of an IP checksum;
   modifying the section length value to the IP length value if the section length value does not match the IP length value and the IP header checksum is valid; and
   retaining the section length value if the section length value matches the IP length value and the IP checksum is valid.

8. The method of claim 7 further comprising:
   comparing an address field of the received TS packet with a predetermined address value;
   modifying the address field of the received TS packet based on a current location of a section if the address field does not match the predetermined address value; and
   modifying a table and/or a frame boundary flag of the received TS packet.

9. The method as in claim 1 wherein if the PID field of the received TS packet matches the selected PID value and the CC field of the received TS packet does not match the expected CC value, the CC field of the received TS packet is changed to a value stored in a shadow counter.

10. A method of grooming transport stream (TS) packets in a receiver of a digital video broadcasting (DVB) system, the method comprising:
   parsing a header field of a received TS packet;
   comparing a packet identifier (PID) field of the received TS packet with a selected packet identifier (PID) value;
   comparing a continuity counter (CC) field of the received TS packet with an expected CC value;
   modifying the CC field of the received TS packet if the PID field of the received TS packet matches the selected PID value and the CC field of the received TS packet does not match the expected CC value;
   changing the PID field of the received TS packet to the selected PID value if the PID field of the received TS packet does not match the selected PID value and the CC field of the received TS packet matches the expected CC value;
   forwarding the received TS packet to a processing module if the PID field of the received TS packet matches the selected PID value and the CC field of the received TS packet matches the expected CC value;
   comparing an adaptation field control of the received TS packet with a predetermined adaptation field control pattern;
   modifying an adaptation field length if the PID field of the received TS packet matches the selected PID value and the adaptation field control of the received TS packet matches the predetermined adaptation field control pattern;
   checking a payload unit start indicator (PUSI) field of the received TS packet;
   resetting the PUSI field if the PID field of the received TS packet matches the selected PID value and the PUSI field of the received TS packet is equal to unity;
   retaining the PUSI field of the received TS packet if the PID field of the received TS packet matches the selected PID value and the PUSI field is equal to zero;
   comparing a pointer field of the received TS packet with an expected pointer value;
   setting the pointer field of the received TS packet to a minimum length value if the PID field of the received TS packet matches the selected PID value, the PUSI field of the received TS packet is equal to unity, and the pointer field of the received TS packet does not match the expected pointer value; and modifying a table ID field of the received TS packet if the PUSI field of the received TS packet is equal to unity and a byte indicated by the pointer field of the received TS packet is not a valid table ID.

\* \* \* \* \*